United States Patent [19]
Maltsev et al.

[11] Patent Number: 6,018,597
[45] Date of Patent: Jan. 25, 2000

[54] METHOD AND APPARATUS FOR CHANGING OR MAPPING VIDEO OR DIGITAL IMAGES FROM ONE IMAGE DENSITY TO ANOTHER

[75] Inventors: Pavel A. Maltsev, Edmonds; Ken Coffman, Mount Vernon, both of Wash.

[73] Assignee: Intermec IP Corporation, Beverly Hills, Calif.

[21] Appl. No.: 08/821,901

[22] Filed: Mar. 21, 1997

[51] Int. Cl.$^7$ .............................. G06T 3/40; G06F 17/00
[52] U.S. Cl. .................... 382/260; 382/279; 382/298; 382/300; 382/305; 708/300; 708/420; 708/290
[58] Field of Search ................... 382/260, 279, 382/298, 299, 300, 305; 358/451; 395/102; 345/439, 127, 132; 708/300, 420, 290

[56] References Cited

U.S. PATENT DOCUMENTS

| | | | |
|---|---|---|---|
| 4,578,812 | 3/1986 | Yui | 382/300 |
| 4,656,664 | 4/1987 | Anderson et al. . | |
| 4,712,140 | 12/1987 | Mintzer et al. | 382/260 |
| 4,912,567 | 3/1990 | Nakajima et al. | 358/451 |
| 5,008,752 | 4/1991 | Nostrand | 358/451 |
| 5,097,518 | 3/1992 | Scott et al. . | |
| 5,125,042 | 6/1992 | Kerr et al. | 382/300 |
| 5,138,672 | 8/1992 | Hirabayashi et al. . | |
| 5,157,517 | 10/1992 | Byrne et al. | 358/452 |
| 5,359,674 | 10/1994 | van der Wal | 382/261 |
| 5,535,018 | 7/1996 | Yamano et al. | 358/444 |
| 5,561,617 | 10/1996 | van der Wal . | |
| 5,701,365 | 12/1997 | Harrington et al. | 382/212 |

OTHER PUBLICATIONS

R. Keys, "Cubic Convolution Interpolation for Digital Image Processing," *IEEE Transactions on Acoustics, Speech, and Signal Processing, ASSP–29*:6, pp. 1153–1160, Dec., 1981.

S. Park and R. Schowengerdt, "Image Reconstruction by Parametric Cubic Convolution," *Computer Vision, Graphics, and Image Processing 23*, pp. 258–272, 1983.

L. Koskinen, J. Astola, and Y. Neuvo, "Soft Morphological Filters," in *Proc. SPIE Symp on Image Algebra and Morphological Image Processing II*, San Diego, CA, pp. 262–270, Jul., 1991.

L. Koskinen and J. Astola, "Statistical properties of soft morphological filters," in *Proc. SPIE vol. 1658 Nonlinear Image Processing III*, pp. 25–36, 1992.

P. Kuosmanen, L. Koskinen, and J. Astola, "An Adaptive Morphological Filtering Method," *Proc. EUSIPCO–92*, Brussels, Belgium, 4 pages, Aug. 1992.

P. Kuosmanen, L. Koskinen, and J. Astola, "The Connection between Generalized Soft Morphological Operations and Stack Filters," Academic Dissertation, Acta Universitatis Tamperensis, Ser. A, vol. 362, Tampere, Finland, 6 pages, 1993.

P. Maltsev, "Soft morphological filters and hierarchical discrete transformations," in *Proc. SPIE vol. 2180 Nonlinear Image Processing V*, San Jose, CA, pp. 175–184, Feb., 1994.

*Primary Examiner*—Scott Rogers
*Attorney, Agent, or Firm*—Perkins Coie LLP

[57] ABSTRACT

A method and apparatus for resizing digital or stored images initially retrieves a one-dimensional sample of the image, such as a line of pixels. A final image size D is determined so that the absolute value of the original sample size $M-2^N*D$ is a minimum, and where N is an integer greater than or equal to 0. The discrete series of pixels in the line are then converted to a continuous function under a cubic convolution interpolation technique. From the continuous function, intermediate pixel values are determined. Pyramid filtering is employed to filter the intermediate pixel values to a final series of pixel values D. The routine is performed along the opposite dimension so as to alter the size of a two-dimensional stored image.

19 Claims, 5 Drawing Sheets

METHOD AND APPARATUS FOR CHANGING OR MAPPING VIDEO OR DIGITAL IMAGES FROM ONE IMAGE DENSITY TO ANOTHER

TECHNICAL FIELD

The present invention relates to a method and apparatus for resizing images, including images of machine-readable symbols and text.

BACKGROUND OF THE INVENTION

Frequently, the size of a video or other digital image must be resized for a particular application. For example, a digital image may need to be reduced or enlarged to fit within a certain area in a document. Alternatively, an automated process may require a series of video images of varying sizes to be enlarged or reduced to a fixed size.

Enlarging or expanding a video image typically involves repeating pixels in a sampled video image. Expanding the dimensional format or size of a video image typically does not involve many problems. However, reducing the size of an image often induces noise such as aliasing frequencies which are added to the synthesized, reduced image. For example, lines as artifacts can be created within an image by resampling the image. Prior techniques for eliminating such aliasing frequencies include finite impulse response (FIR) and infinite impulse response (IIR) filtering to remove this noise. A problem with such filtering techniques is that they are less than optimally effective or require significant processing time.

One solution for reducing errors or noise in image resizing involves interpolation. As is known, interpolation is the process of estimating the intermediate values of a continuous event from discrete samples, such as discrete pixels in a digital image. Interpolation has been used to magnify or reduce digital images. Since digital images often involve large amounts of data, efficient interpolation methods are required.

One efficient interpolation method is the cubic convolution interpolation method, which is described, for example, in S. Park, "Image Reconstruction By Parametric Cubic Convolution," *Computer Vision, Graphics and Image Processing*, 23:258–272, and R. Keys, "Cubic Convolution Interpolation For Digital Image Processing," *IEEE Transactions on Acoustics, Speech, and Signal Processing*, Vol. ASSP-29, No. 6, December, 1981. Cubic convolution interpolation methods are useful in image processing, and provide accuracy which is better than linear interpolation, but less than cubic spline methods, while still being capable of being efficiently performed on a computer.

As is known, a fundamental property of all interpolation functions is that they must coincide with the sampled data at the interpolation nodes or sample points. Considering only the x-axis dimension of a two-dimensional image, if f is a sampled function, such as one line of pixels in a digital image, and if C is the corresponding interpolation fuinction, then $C(x_p)=f(x_p)$ whenever $x_p$ is at an interpolation node (i.e., at a pixel point). While interpolation of a one-dimensional function is described below, interpolation in two dimensions is readily accomplished by performing the one-dimensional interpolation in each dimension, as noted in the Keys article.

For equally spaced data, such as pixels in the image line, many interpolation functions can be written in the form of $$C(x) = \sum_p w_p * k\left(\frac{x - x_p}{h}\right), \qquad (1)$$

where h represents the sampling increment, the $x_k$'s are the interpolation points, k is the interpolation kernel, and C is the interpolation function. The $w_p$'s are parameters which depend upon the sampled data, and are selected so that the interpolation condition $C(x_p)=f(x_p)$ is true for each $x_p$. Typically, $w_j$ corresponds to the input or sampled pixel values in the image.

The cubic convolution interpolation kernel k is composed of piecewise cubic polynomials defined on sub-intervals within a given interval, e.g., (−2, 2), while the kernel has a value of 0 outside of the interval. On the interval (−2, 2), four sub-intervals, (−2, −1), (−1, 0), (0, 1), and (1, 2) exist, and thus only four data points or samples are used to evaluate the interpolation function under equation (1). Additionally, the interpolation kernel must be symmetric. Thus, the interpolation kernel k becomes:

$$k(z)=a_0+a_1|z|+a_2|z*z|+a_3|z*z*z|, \text{ if } 0<|z|<1;$$

$$k(z)=b_0+b_1|z|+b_2|z*z|+b_3|z*z*z|, \text{ if } 1<|z|<2;$$

$$k(z)=0, \text{ if } |z|>2; \qquad (2)$$

$$k(0)=1;$$

$$k(z)=0, \text{ if } z \text{ is an integer.}$$

Since h is the sampling increment, the difference between the interpolation points $x_j$ and $x_p$ is (j−p)h. Therefore, substituting $x_j$ for x in Equation (1), and selecting four samples on the interval (−2, 2), the following equation results:

$$C(x_j) = \sum_{p=-1}^{2} w_p * k(j - p), \qquad (3)$$

The domain of the sampled function f(x) is restricted to a finite interval, and thus boundary conditions are necessary. Considering the interval (0, 1), the values outside of the interval are considered, i.e., −1 and 2. As a result, the summation under equation (3) extends from p=−1 to p=2.

Because k(j−p) is 0 unless j=p, the right-hand side of Equation (3) reduces to $w_p$, since the interpolation condition requires that $C(x_p)=f(x_p)$. In addition to being 0 or 1 at the interpolation points, the interpolation kernel k must be continuous and have a continuous first derivative on the intervals (−2, −1), (−1, 0), (0, 1), and (1, 2). In other words, the interpolation kernel must be connected with the smoothness of the function k(z). Thus, k(z) must be of the class $C^1(\text{Re})$. As a result, four equations for the coefficients $a_0$ through $a_3$ and $b_0$ through $b_3$ in Equation (2) above exists, and three equations result from the fact that the first derivative of the interpolation kernel is continuous at the points 0, 1, and 2. However, eight unknown coefficients exist. As a result, an eighth equation is necessary to obtain a unique solution.

Assuming that f(x) has several orders of continuous derivatives so that Taylor's theorem applies, we then assume that the cubic convolution interpolation function and the Taylor series expansion for f(x) agree for as many terms as possible. Therefore, letting $b_3=u$, the remaining seven coefficients can be determined in terms of u from the seven equations as follows:

$k(z)=1-(u+3)|z*z|+(u+2)|z*z*z|$, if $0<|z|<1$;

$k(z)=-4+8u|z|-5u|z*z|+u|z*z*z|$, if $1<|z|<2$; (4)

$k(z)=0$, otherwise.

If the image is to be transformed within minimum alteration, i.e., minimum interpolation error, u is derived from the first terms of the Taylor series expansion of the original sampling function f(x). The Keys article proposes a solution to Equation (4) where $u=-\frac{1}{2}$, which achieves third-order precision. In other words, the interpolation error goes to 0 uniformly at a rate proportional to the cube of the sampling increment.

Overall, the cubic convolution interpolation method transforms a series of discrete samples into a continuous function. From the continuous function, the image can be resized. However, multiple resizing techniques are available. Additionally, the cubic convolution interpolation method is subject to initial assumptions which affect the resulting continuous function.

SUMMARY OF THE INVENTION

In a broad sense, an embodiment of the present invention includes an apparatus and corresponding method for resizing a stored image, where the stored image is comprised of a plurality of pixels. The apparatus includes a convolution interpolator and a pyramid filter. The convolution interpolator is coupled to receive the stored image and produce a set of intermediate pixel values based on M number of pixels in the stored image. In an embodiment, the interpolator includes cubic convolution interpolation circuitry that produces $2^N*D$ intermediate pixel values based on M number of pixels in the stored image, where N and D are whole numbers selected so that an absolute value of $M-2^N*D$ is a minimum. The pyramid filter is coupled to the cubic convolution interpolator and alters the intermediate pixel values to D number of pixels, where D is an integer not equal to M. In an embodiment of the present invention, the pyramid filter includes pyramid filter circuitry that reduces the $2^N*D$ intermediate pixel values to D number of pixels, wherein the pyramid filter circuitry analyzes a window of L number of pixels in the $2^N*D$ intermediate pixel values, and wherein the window jumps $2^N$ pixels along the $2^N*D$ intermediate pixel values.

DETAILED DESCRIPTION OF THE INVENTION

A machine vision system, and in particular, an apparatus and method for resizing images is described in detail herein.

In the following description, numerous specific details are set forth such as specific interpolation kernels, boundary conditions, images, resolutions, in order to provide a thorough understanding of the present invention. One skilled in the relevant art, however, will readily recognize that the present invention can be practiced without the specific details, or with other kernels, conditions, images, resolutions, etc. In other instances, well-known structures and operations are not shown in detail in order to avoid obscuring the present invention.

Figure 1:
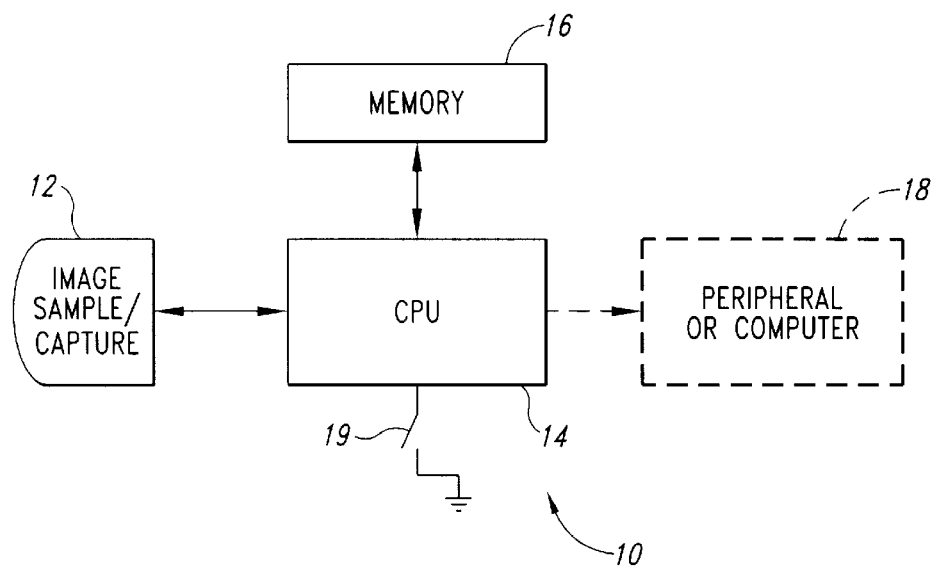
FIG. 1 is a block diagram of a reader under an embodiment of the present invention.

As shown in FIG. 1, a first embodiment of a reader system 10 of the present invention includes an image sampling or capturing device 12.

In an exemplary embodiment, the image capture device 12 is an area imager that contains an array of photosensitive elements, preferably a charge-coupled device ("CCD") having, for example, a rectangular active surface of 582×752 pixel elements. Other known area imagers may be used, such as vidicons, two-dimensional semiconductor arrays or a linear CCD array having mechanical means to pivot the array and provide resolution in an axis perpendicular to the linear axis of the CCD array. Additionally, other sized CCD arrays may be used, for example, circular or square CCD arrays. The 582×752 pixel element array defines the field of view of the area imager. Appropriate conventional focusing optics, electronics and/or a light source (not shown) are also provided as part of the area imager.

As is known, each pixel element in the CCD array of the area imager outputs a gray level signal, i.e., an analog signal that determines the amount or intensity of light impinging upon the particular pixel element. Alternatively, each pixel element in the CCD array of the area imager can output a signal that indicates the gray intensity value of the particular pixel element. The signals output from the CCD array are similar to video data. While the exemplary embodiment of the image sample/capture device 12 is an area imager, those skilled in the relevant art will readily recognize that other image sampling or capture devices can be employed such as laser scanners, pen-based readers, etc.

A central processing unit ("CPU") 14 receives the video data signals output from the area imager. The CPU 14 preferably includes an analog-to-digital converter that converts the gray level analog signals from the area imager into digital signals. The CPU 14 also preferably includes a clock operating at a high speed so that the CPU similarly operates at a rapid rate.

A memory 16, coupled to the CPU 14, stores the digital signals output from the CPU. The memory 16 preferably includes both volatile and non-volatile memory (e.g., random access and electronically erasable read only memory). An object or image within the field of view of the area imager is converted into electrical signals that are digitized and stored in the memory 16 to be retrieved and processed by the CPU 14 under the routine described below. After processing the stored image, the CPU 14 can output to a peripheral apparatus or computer 18 the results of such processing. The reader 10 may be a hand-held product and include a trigger switch 19 coupled to the CPU 14. By actuating the trigger switch 19, the CPU 14 causes the area imager to provide image signals to the CPU that constitute the instantaneous image within the field of view of the area imager. The specific means and method for storing an image of a symbol by the reader 10 are conventional and will be understood by those skilled in the relevant art without need for further description herein.

Figure 2:
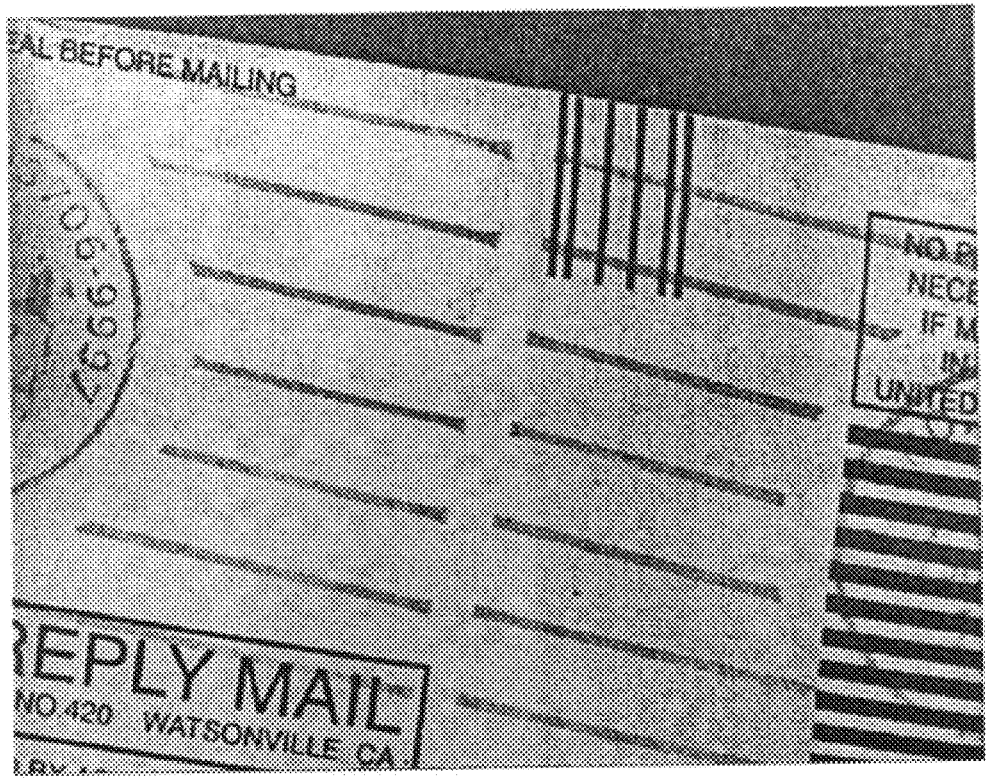
FIG. 2 is an example of a digitized image stored in a memory of the reader of FIG. 1.

In an example discussed herein, the reader 10 captures and stores an image of a data collection symbol such as a data collection symbol formed on an envelope, and surrounding visual information such as alphanumeric characters. FIG. 2 shows an exemplary image captured and stored in the memory 16 of the reader 10. While the image of FIG. 2 is generally rectangular, for simplicity, the example discussed herein will have equal x and y pixel density. Therefore, under the example described herein, the image of FIG. 2 has a pixel density of 2,500 by 2,500 pixels. An embodiment of the present invention reduces the pixel density to 1,100 by 1,100 pixels, as described below.

As used herein, a "data collection symbol" refers to a symbol from any of the linear, stacked, area and other machine-readable symbologies. "Linear" symbologies generally encode data characters as parallel arrangements of multiple width rectangular bars and spaces. Each group of unique pattern of bars and spaces within a predetermined width defines a particular data character. "Stacked symbologies" generally employ several adjacent rows, each row having several characters defined by groups of multiple width bars and spaces. An "area" symbology employs a matrix of data cells rather than one or more rows of bars and spaces. The height and width of each data cell within the matrix are generally equal, and the height and width of the symbol are generally comparable.

Figure 3:
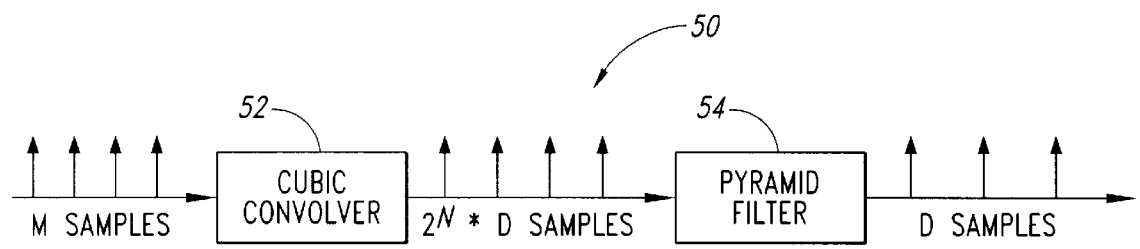
FIG. 3 is a basic block diagram of an image resizing system under an embodiment of the present invention.

Referring to FIG. 3, a system 50 under an embodiment of the present invention employs two basic operations in resizing an image composed of a plurality of samples or pixels. A one-dimensional slice of the image includes M number of samples. A cubic convolver 52 employs a cubic convolution technique, described below, on the M number of samples to produce $2^N*D$ number of samples. The value D corresponds to the final image density and N is an integer. To reduce the size of the image, N is typically a whole number (i.e., an integer greater than or equal to 0) while N can have a negative number if the image is to be enlarged. The cubic convolver 52 produces a continuous function based on the initial series of M number of samples. Thereafter, as explained below, an intermediate number of samples $2^N*D$ are produced from the cubic convolver 52 so that subsequent pyramid filtering can be effectively performed without any aliasing errors.

A pyramid filter 54 filters the $2^N*D$ number of samples to produce D number of samples. Employing the exemplary image of FIG. 2, the cubic convolver 52 reduces M=2,500 pixels to $2^N*D$=2,200 pixels, while the pyramid filter 54 further reduces the number of pixels to D=1,100 pixels, as described below.

Figure 4:
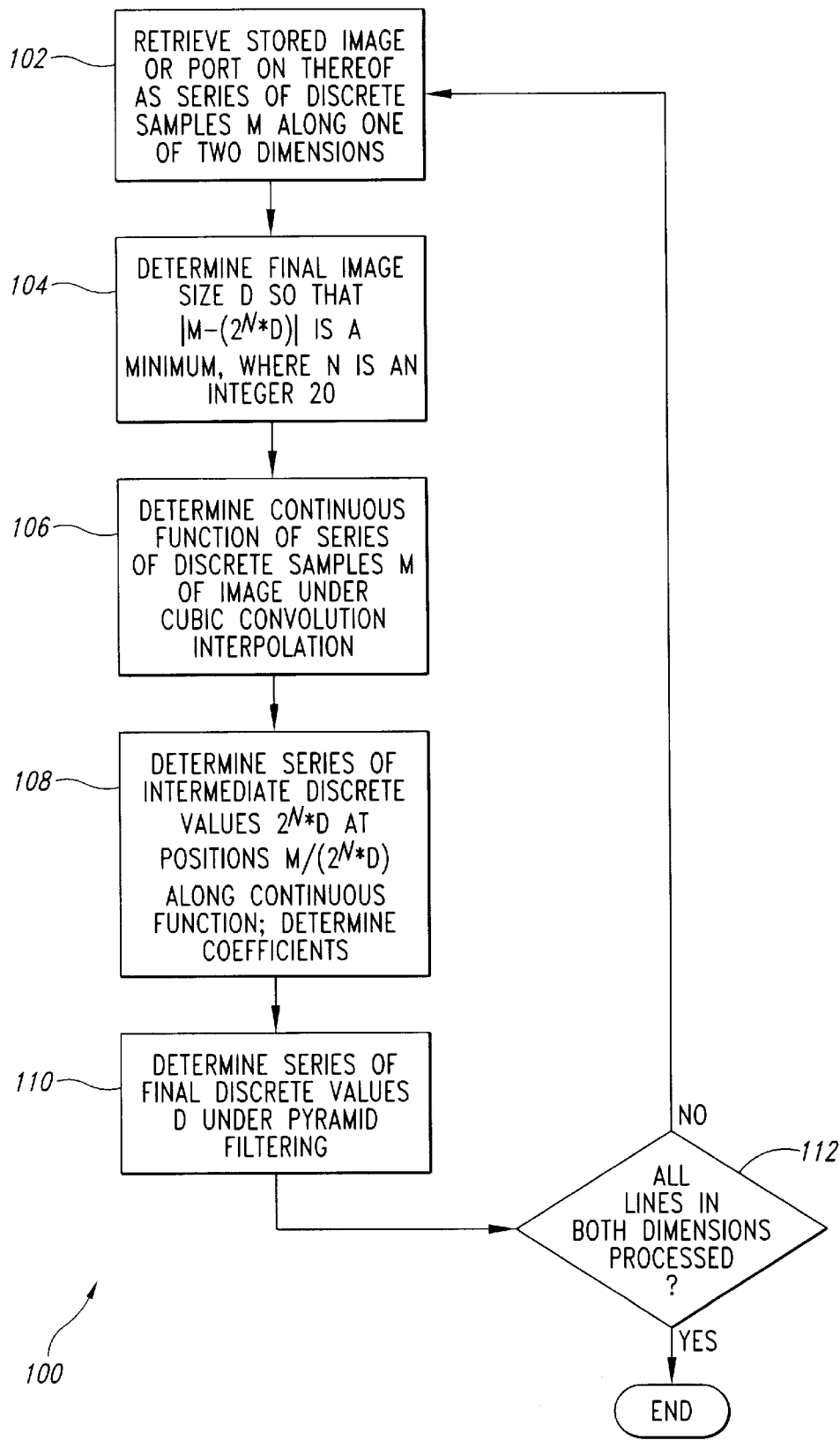
FIG. 4 is a flow diagram of the method of FIG. 3.

Referring to FIG. 4, a routine 100, executed by the CPU 14, retrieves and processes an image from the memory 16 of the reader 10. The routine 100 is preferably performed with one or more high-speed CPUs, and in readers having two-dimensional sampling of pixels within a stored image. However, the present invention can also be employed with laser scanner readers, pen-based readers, and other known machine-readable symbol readers. The routine 100, and all the routines and methods described herein, are permanently stored within the non-volatile memory portion of the memory 16.

The routine 100 begins in step 102, where the CPU 14 retrieves a stored image or portion thereof which is stored in the memory 16. The CPU 14 in step 102 retrieves only the M number of samples in one of two dimensions. As explained below, the CPU 14 performs the routine 100 twice to alter the pixel density or size of a two-dimensional stored image.

Prior to step 102, the reader 10 produces one or more signals based on light reflected from an object or image, such as a symbol, and stores the signals as an image or partial image of the symbol. As explained herein, various methods and apparatus for receiving light reflected from the symbol and producing signals therefrom are known to those skilled in the art. In an exemplary embodiment, the reader 10 produces an image signal representing the entire symbol and field of view of the reader, which is stored in the memory 16. As used herein, the term "stored image" generally refers to the overall image of the field of view stored in memory 16 that has been produced by the area imager and the CPU 14, and which contains the symbol or symbols to be read and/or other information (e.g., human readable characters).

The memory 16 includes for processing efficiency an array of memory locations addressed by the CPU 14 that correspond to and represent the pixels in the field of view of the CCD array. The stored image is referenced by a Cartesian coordinate system so that the location of each pixel is represented by a pair of numbers indicating the horizontal and vertical position of the pixel in the stored image. As a result, the CPU 14 can rapidly access and retrieve selected pixels in the stored image.

In step 104, the CPU 14 begins an initial step for cubic convolution interpolation of the one-dimensional line or series of pixels M in the stored image. Under step 104, the CPU 14 determines a new image with a pixel density equal to $2^N*D$, where D is a modified image scaling factor. In other words, D represents the desired, final pixel density under the routine 100. Under an exemplary embodiment, D=1,100 pixels, which is the desired, final pixel density, however, other values are acceptable. Indeed, a greater pixel density could be employed (i.e., D>2,500 pixels). The value of N is selected to be an integer value greater than or equal to 0 so that the absolute value of the difference between the original pixel density M and the intermediate pixel density $2^N*D$ is minimal (i.e., abs (M-$2^N*D$) is minimal). Under the present example, abs (2,500-$2^N*1,100$) results in N=1. As noted above, by determining values for D and N, subsequent pyramid filtering is performed without aliasing or other errors, as described herein.

In step 106, the CPU 14 determines a continuous fuinction based on the series of discrete samples M from the image retrieved under step 102 by employing a cubic convolution interpolation technique. Under step 106, the CPU 14 effectively determines a continuous function from the M number of pixels under equations (3) and (4) above. Under equation (3) the CPU 14 employs a moving window that analyzes groups of four pixels at a time. As a result, the CPU 14 in step 106 determines a continuous function between every two pixels in the series of M number of pixels in the stored image as the four pixel wide window moves sequentially through the M number of pixels.

Under the exemplary embodiment, u is equal to 0.5. However, u can range from 0.1 to 3 based on a spectrum of the stored image. For example, if the stored image includes high frequency noise, a higher value for the parameter u can be selected so as to suppress such high frequency noise. In general, the parameter u is selected to modify the image, if necessary, to provide low or high pass filtering or image enhancement. If the image is to be transformed under the cubic convolution interpolation method with minimum alteration, or minimum interpolation error, u is derived from the first four terms of the Taylor series expansion of the original sampling function.

In step 108, the CPU 14 determines a series of intermediate discrete values $2^N*D$ at positions M/($2^N*D$) along the continuous function previously determined under step 106.

In other words, after having produced a continuous function from the series of discrete samples N in the stored image, the CPU 14 determines a series of intermediate values therebetween. These intermediate discrete values are subsequently and efficiently filtered, as explained below.

Figure 5:
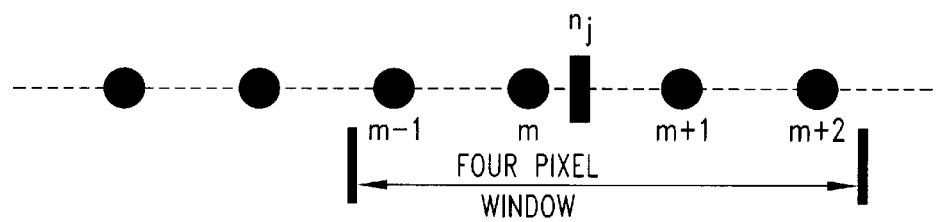
FIG. 5 shows a series of pixels from the image of FIG. 2 and an intermediate pixel value determined therefrom.

Referring to FIG. 5, a series of original pixel values m−1, m, m+1 and m+2 are shown. The original pixel values m−1 through m+2 correspond to pixels in the original M number of pixels in the stored image. An intermediate pixel value $n_j$ is shown between pixel m and pixel m+1. As noted above, the cubic convolution interpolation method under equation (3) employs a moving window of four pixels: two pixels before a given pixel, and one pixel behind. A ratio r=M/($2^N$*D) defines the position of interpolated pixels relative to pixels in the original image. From equation (3) CPU 14 in step 108 samples pixel values in the original M number of pixels within a window of [$m_{j−1}$, $m_{j+2}$], where j=1, . . . , 2200, so that $n_j$=r*j. In the above example, r=2500/2200=25/22.

In step 108, the CPU 14 also computes the coefficients k(z) under equation (4) above, where z is a distance from $n_j$ to the pixels m−1, m, m+1 and m+2. For every intermediate pixel $n_j$, the CPU 14 determines four coefficients k(−1), k(0), k(1) and k(2) which correspond to distances from the intermediate pixel to the original pixels m−1, m, m+1 and m+2, respectively. The coefficient values are repeatable based on the denominator dermined for the ratio value r above. Under the above example, r=25/22, the coefficients are repeatable every 22 steps. In other words, every twenty-second intermediate pixel determined in step 108 corresponds to one of the original pixels in the M number of pixels in the original image. Table 1 below shows the coefficient values for the first 100 steps determined by the CPU 14. As shown, every twenty-second step produces the coefficient k [0] having a value of 1, while the coefficients, k [−1], k [1] and [2] all have a value of 0.

TABLE 1

| step | k [−1] | k [0] | k [1] | k [2] |
|---|---|---|---|---|
| 0 | 0.00000 | 1.00000 | 0.00000 | 0.00000 |
| 1 | −0.05085 | 0.95732 | 0.10157 | −0.00803 |
| 2 | −0.07213 | 0.84448 | 0.25470 | −0.02705 |
| 3 | −0.07142 | 0.68431 | 0.43656 | −0.04945 |
| 4 | −0.05635 | 0.49962 | 0.62434 | −0.06762 |
| 5 | −0.03451 | 0.31325 | 0.79522 | −0.07396 |
| 6 | −0.01352 | 0.14801 | 0.92637 | −0.06086 |
| 7 | −0.00099 | 0.02672 | 0.99498 | −0.02071 |
| 8 | 0.03757 | 0.98047 | 0.06086 | −0.00376 |
| 9 | −0.06785 | 0.88848 | 0.19933 | −0.01996 |
| 10 | −0.07363 | 0.74155 | 0.37415 | −0.04207 |
| 11 | −0.06250 | 0.56250 | 0.56250 | −0.06250 |
| 12 | −0.04207 | 0.37415 | 0.74155 | −0.07363 |
| 13 | −0.01996 | 0.19933 | 0.88848 | −0.06785 |
| 14 | −0.00376 | 0.06086 | 0.98047 | −0.03757 |
| 15 | −0.02071 | 0.99498 | 0.02672 | −0.00099 |
| 16 | −0.06086 | 0.92637 | 0.14801 | −0.01352 |
| 17 | −0.07396 | 0.79522 | 0.31325 | −0.03451 |
| 18 | −0.06762 | 0.62434 | 0.49963 | −0.05635 |
| 19 | −0.04945 | 0.43656 | 0.68431 | −0.07142 |
| 20 | −0.02705 | 0.25470 | 0.84448 | −0.07213 |
| 21 | −0.00803 | 0.10157 | 0.95732 | −0.05085 |
| 22 | 0.00000 | 1.00000 | 0.00000 | 0.00000 |
| 23 | −0.05085 | 0.95732 | 0.10157 | −0.00803 |
| 24 | −0.07213 | 0.84448 | 0.25470 | −0.02705 |
| 25 | −0.07142 | 0.68431 | 0.43656 | −0.04945 |
| 26 | −0.05635 | 0.49963 | 0.62434 | −0.06762 |
| 27 | −0.03451 | 0.31325 | 0.79522 | −0.07396 |
| 28 | −0.01352 | 0.14801 | 0.92637 | −0.06086 |
| 29 | −0.00099 | 0.02672 | 0.99498 | −0.02071 |
| 30 | −0.03757 | 0.98047 | 0.06086 | −0.00376 |
| 31 | −0.06785 | 0.88848 | 0.19933 | −0.01996 |
| 32 | −0.07363 | 0.74155 | 0.37415 | −0.04207 |
| 33 | −0.06250 | 0.56250 | 0.56250 | −0.06250 |
| 34 | −0.04207 | 0.37415 | 0.74155 | −0.07363 |
| 35 | −0.01996 | 0.19933 | 0.88848 | −0.06785 |
| 36 | −0.00376 | 0.06086 | 0.98047 | −0.03757 |
| 37 | −0.02071 | 0.99498 | 0.02672 | −0.00099 |
| 38 | −0.06086 | 0.92637 | 0.14801 | −0.01352 |
| 39 | −0.07396 | 0.79522 | 0.31325 | −0.03451 |
| 40 | −0.06762 | 0.62434 | 0.49962 | −0.05635 |
| 41 | −0.04945 | 0.43656 | 0.68431 | −0.07142 |
| 42 | −0.02705 | 0.25470 | 0.84448 | −0.07213 |
| 43 | −0.00803 | 0.10157 | 0.95732 | −0.05085 |
| 44 | 0.00000 | 1.00000 | 0.00000 | 0.00000 |
| 45 | −0.05085 | 0.95732 | 0.10157 | −0.00803 |
| 46 | −0.07213 | 0.84448 | 0.25470 | −0.02705 |
| 47 | −0.07142 | 0.68431 | 0.43656 | −0.04945 |
| 48 | −0.05635 | 0.49962 | 0.62434 | −0.06762 |
| 49 | −0.03451 | 0.31325 | 0.79522 | −0.07396 |
| 50 | −0.01352 | 0.14801 | 0.92637 | −0.06086 |
| 51 | −0.00099 | 0.02672 | 0.99498 | −0.02071 |
| 52 | −0.03757 | 0.98047 | 0.06086 | −0.00376 |
| 53 | −0.06785 | 0.88848 | 0.19933 | −0.01996 |
| 54 | −0.07363 | 0.74155 | 0.37415 | −0.04207 |
| 55 | −0.06250 | 0.56250 | 0.56250 | −0.06250 |
| 56 | −0.04207 | 0.37415 | 0.74155 | −0.07363 |
| 57 | −0.01996 | 0.19933 | 0.88848 | −0.06785 |
| 58 | −0.00376 | 0.06086 | 0.98046 | −0.03757 |
| 59 | −0.02071 | 0.99498 | 0.02672 | −0.00099 |
| 60 | −0.06086 | 0.92637 | 0.14801 | −0.01352 |
| 61 | −0.07396 | 0.79522 | 0.31325 | −0.03451 |
| 62 | −0.06762 | 0.62434 | 0.49962 | −0.05635 |
| 63 | −0.04945 | 0.43656 | 0.68431 | −0.07142 |
| 64 | −0.02705 | 0.25470 | 0.84448 | −0.07213 |
| 65 | −0.00803 | 0.10157 | 0.95731 | −0.05086 |
| 66 | 0.00000 | 1.00000 | 0.00000 | 0.00000 |
| 67 | −0.05085 | 0.95732 | 0.10157 | −0.00803 |
| 68 | −0.07213 | 0.84448 | 0.25470 | −0.02705 |
| 69 | −0.07142 | 0.68431 | 0.43656 | −0.04945 |
| 70 | −0.05635 | 0.49962 | 0.62434 | −0.06762 |
| 71 | −0.03451 | 0.31325 | 0.79522 | −0.07396 |
| 72 | −0.01352 | 0.14801 | 0.92637 | −0.06086 |
| 73 | −0.00099 | 0.02672 | 0.99498 | −0.02071 |
| 74 | −0.03757 | 0.98046 | 0.06086 | −0.00376 |
| 75 | −0.06785 | 0.88848 | 0.19933 | −0.01996 |
| 76 | −0.07363 | 0.74155 | 0.37415 | −0.04207 |
| 77 | −0.06250 | 0.56250 | 0.56250 | −0.06250 |
| 78 | −0.04207 | 0.37416 | 0.74154 | −0.07363 |
| 79 | −0.01996 | 0.19933 | 0.88848 | −0.06785 |
| 80 | −0.00376 | 0.06086 | 0.98046 | −0.03757 |
| 81 | −0.02071 | 0.99498 | 0.02672 | −0.00099 |
| 82 | −0.06086 | 0.92637 | 0.14801 | −0.01352 |
| 83 | −0.07396 | 0.79522 | 0.31325 | −0.03451 |
| 84 | −0.06762 | 0.62434 | 0.49962 | −0.05635 |
| 85 | −0.04945 | 0.43656 | 0.68431 | −0.07142 |
| 86 | −0.02705 | 0.25470 | 0.84448 | −0.07213 |
| 87 | −0.00803 | 0.10157 | 0.95731 | −0.05086 |
| 88 | 0.00000 | 1.00000 | 0.00000 | 0.00000 |
| 89 | −0.05085 | 0.95732 | 0.10157 | −0.00803 |
| 90 | −0.07213 | 0.84448 | 0.25470 | −0.02705 |
| 91 | −0.07142 | 0.68431 | 0.43656 | −0.04945 |
| 92 | −0.05635 | 0.49962 | 0.62434 | −0.06762 |
| 93 | −0.03451 | 0.31325 | 0.79522 | −0.07396 |
| 94 | −0.01352 | 0.14801 | 0.92637 | −0.06086 |
| 95 | −0.00099 | 0.02672 | 0.99498 | −0.02071 |
| 96 | −0.03757 | 0.98046 | 0.06086 | −0.00376 |
| 97 | −0.06785 | 0.88848 | 0.19933 | −0.01996 |
| 98 | −0.07363 | 0.74155 | 0.37415 | −0.04207 |
| 99 | −0.06250 | 0.56250 | 0.56250 | −0.06250 |

In step 110, the CPU 14 determines a series of final discrete values D under pyramid filtering. In other words, the CPU 14 employs a pyramid filtering routine to reduce their intermediate discrete values $2^N$*D to the final discrete values D. Filters with pyramidal coefficients are robust tools for image reduction and the extraction of bandwidth information. Under an embodiment of the present invention, the CPU 14 in step 110 employs a pyramid filtering routine having a resolution step equal to 2. In other words, five of the intermediate discrete pixel values are employed to produce one final pixel value. Thereafter, two pixels are skipped, and the next five intermediate discrete pixel values are employed to produce a second final pixel value D, etc.

Figure 6:
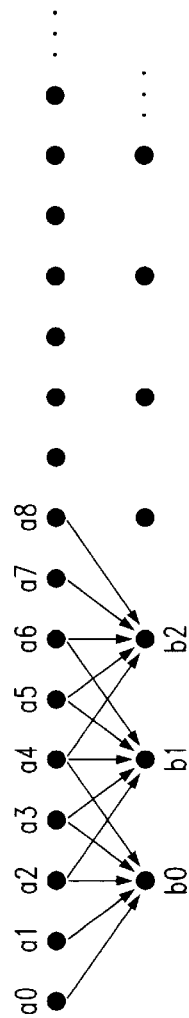
FIG. 6 shows a series of intermediate pixel values that are filtered to final pixel values under the method of FIG. 4.

As shown in FIG. 6, the CPU 14 employs intermediate pixels a0 through a8 to produce final pixel values b0 through b2. As used generally herein, pixel values "aj" and "$n_j$," correspond to intermediate pixel values which are produced after cubic convolution interpolation. Intermediate pixel values a0 through a4 contribute to final pixel value b0, intermediate pixel values a2 through a6 contribute to producing a final pixel value b1, and intermediate pixel values a4 through a8 contribute to produce a final pixel value b2.

Summarizing, the CPU 14 in step 110 performs a pyramid filtering based on the following equation for the above example:

$$bj = c1*a(2j) + c2*a(2j+1) + c3*a(2j+2) + c4*a(2j+3) + c5*a(2j+4) \quad (5)$$

The coefficients c1 through c5 in equation (5) are subject to the following restrictions:
1. Normalization Restriction $$c1+c2+c3+c4+c5=1.$$

2. Symmetry Restriction $$c1=c5, c2=c4. \quad (6)$$

3. Equal Contribution Restriction $$c3+c1+c5=c2+c4.$$

Under the above example, the CPU 14 employs the coefficients c(k), k=1, . . . , 5, where c1=c5=−0.125, c2=c4=0.25 and c3=0.75.

The coefficient values c1 through c5 provide the ability to control the frequency characteristics of the new synthesized image. The CPU 14 can implement a low-pass filtered version of the original image to suppress some artifacts, or a high-pass filtered version of the original image to enhance the high contrast features such as lines, edges, etc., by appropriate selection of the coefficient values c1 through c5. Under the exemplary values of c1 through c5, the third of five pixels in each five pixel window of intermediate pixels (i.e., pixel a(2j+2)) provides a greatest contribution of 0.75 to the final pixel value, while first and last intermediate pixels a(2j) and a(2j+4) detract slightly from the final pixel value by −0.125.

The CPU 14 in step 110 employs a moving or jumping window that analyzes v number of pixels in the $2^N*D$ number of intermediate pixels, and then jumps $2^N$ number of pixels to again analyze a window of v pixels. In the above example, v is equal to 5; however, other typically odd positive integer values for v are acceptable. As a result, equation (5) can be reduced to $$bj = c1*a(2^Nj) + c2*a(2^Nj+1) +\ldots cv*a(2^Nj+(v-1)). \quad (7)$$

Figure 7:
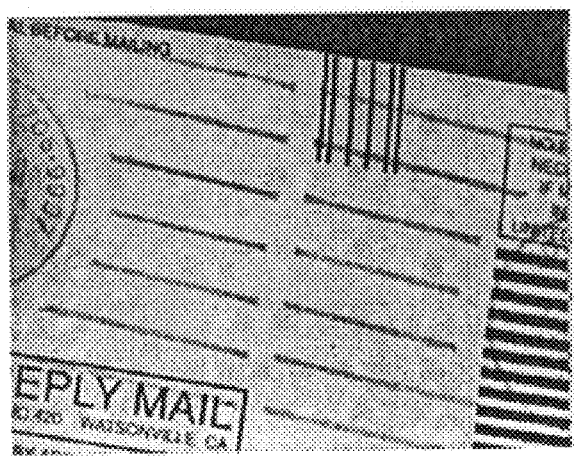
FIG. 7 is an example of a reduced sized digital image resulting from an embodiment of the present invention applied to the image of FIG. 2.

In step 112, the CPU 14 determines whether all lines of both dimensions of the two-dimensional stored image have been processed under the routine 100. If additional lines in one dimension (e.g., the x-axis or horizontal dimension) are still unprocessed, the CPU 14 again performs steps 102–110 as it adjusts the size of the original image along the first dimension. After processing all lines the first dimension, then the CPU 14 again performs steps 102–110 as it adjusts the size of the original image along a second dimension. For example, the CPU 14 first performs steps 102–110 as it reduces the x-axis dimension of the stored image from 2500 pixels down to 1100 pixels. Thereafter, the CPU 14 again performs steps 102–110 as it reduces the y-axis dimension of the image from 2500 pixels down to 1100 pixels. FIG. 7 shows an exemplary digital image resulting from the routine 100 as it reduces the original image of FIG. 2.

Figure 8:
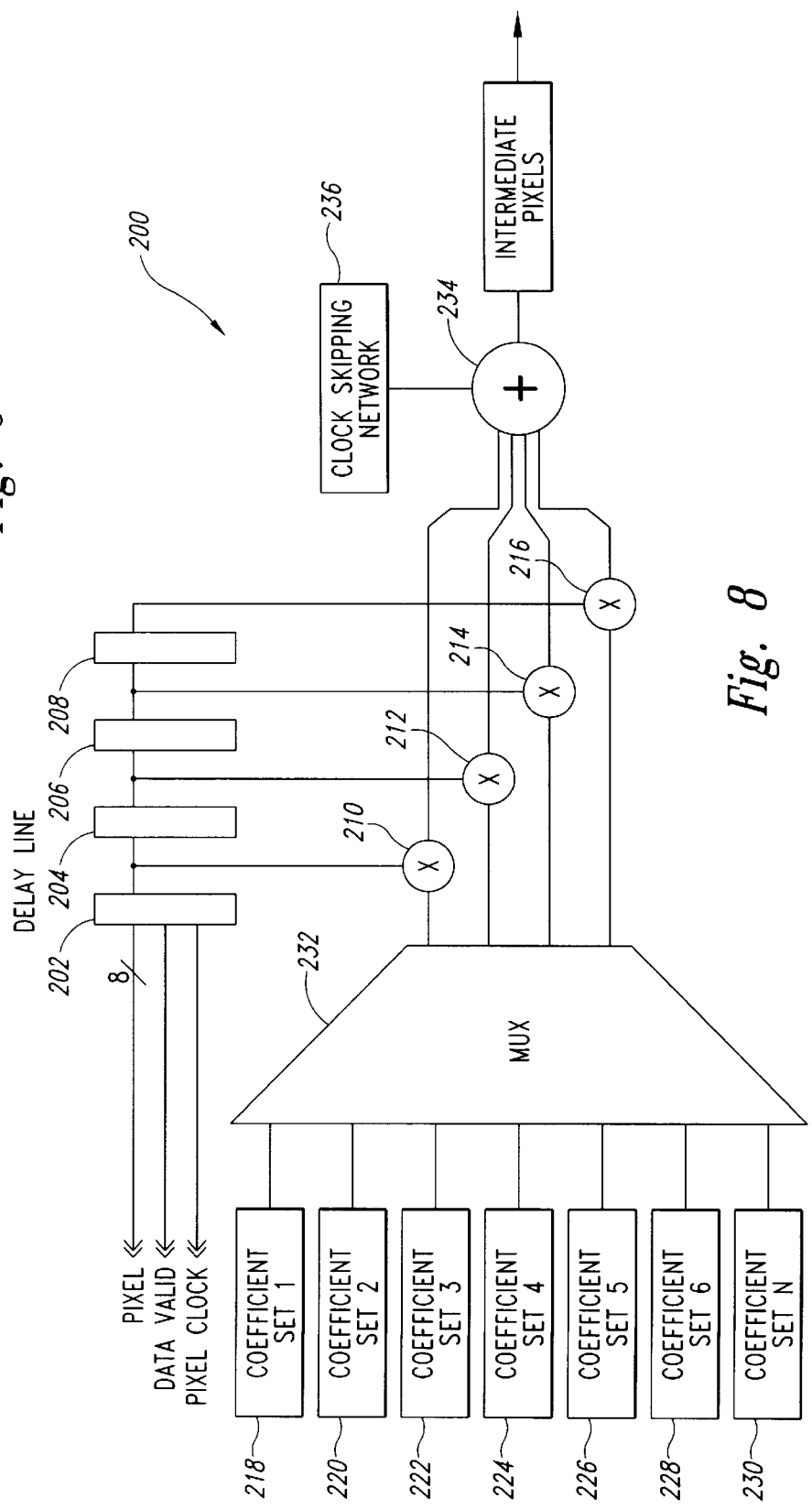
FIG. 8 is a block diagram of an alternative or additional embodiment of a cubic convolver in the system of FIG. 3.

As shown in FIG. 8, an alternative embodiment under the present invention employs a cubic convolver circuit 200 that is similar to several steps in the routine 100 of FIG. 4. This alternative embodiment, and those described herein, are substantially similar to previously described embodiments, and common steps are identified by the same reference numbers. Only the significant differences in operation are described in detail.

The cubic convolver circuit 200 includes four delay elements 202 through 208 that form a delay line. Delay element 204 stores the pixel value of a current pixel in the stored image, delay element 202 stores a previous pixel value, while delay elements 206 and 208 store the next two pixel values in the stored image. Each delay element 202–208 stores a pixel value, such as the pixel value as output by the image capture device 12, or stored in the memory 16. The CPU 14, or other conventional circuitry, provides a data valid and pixel clock signal to the delay elements 202–208 to appropriate clock or time in the pixel value so as to fill the delay line. Thus, the pixel values are clocked in from an image memory and stored in the delay elements 202–208 so that sequential pixels can be operated on.

Multiplier circuits 210–216 are coupled to the delay elements 202–208, respectively, and multiply the stored pixel values with one of n number of coefficients in a set of stored coefficient values 218–230. Under the above example, only 4* 22 coefficients corresponding to the four coefficients k [−1], k [0], k [+1] and k [+2] are stored in the circuit 200 if the circuit is to only perform the exemplary image reduction (see Table 1). A multiplexer 232 sequentially selects each of the coefficients 218–230 and inputs the coefficient to one of the multiplier circuits 210–216.

An adder circuit 234 adds the resulting products from the multiplier circuits 210–216. A clock skipping network 236 appropriately controls the adder circuit 234 so as to output regenerated or intermediate pixel values. As a result, a one-dimensional convolution is performed on the pixel values as they are multiplied by a rotating set of convolution coefficients and the value is summed together. Thus, the circuit 200 produces a set of pixels with a new pixel density that is 2*N times the desired output density D.

The circuitry 200 performs in hardware the cubic convolution interpolation steps performed by the CPU 14 under the routine 100. The circuitry 200 can thereby rapidly perform the cubic convolution interpolation steps, and free the CPU 14 to perform additional tasks.

Figure 9:
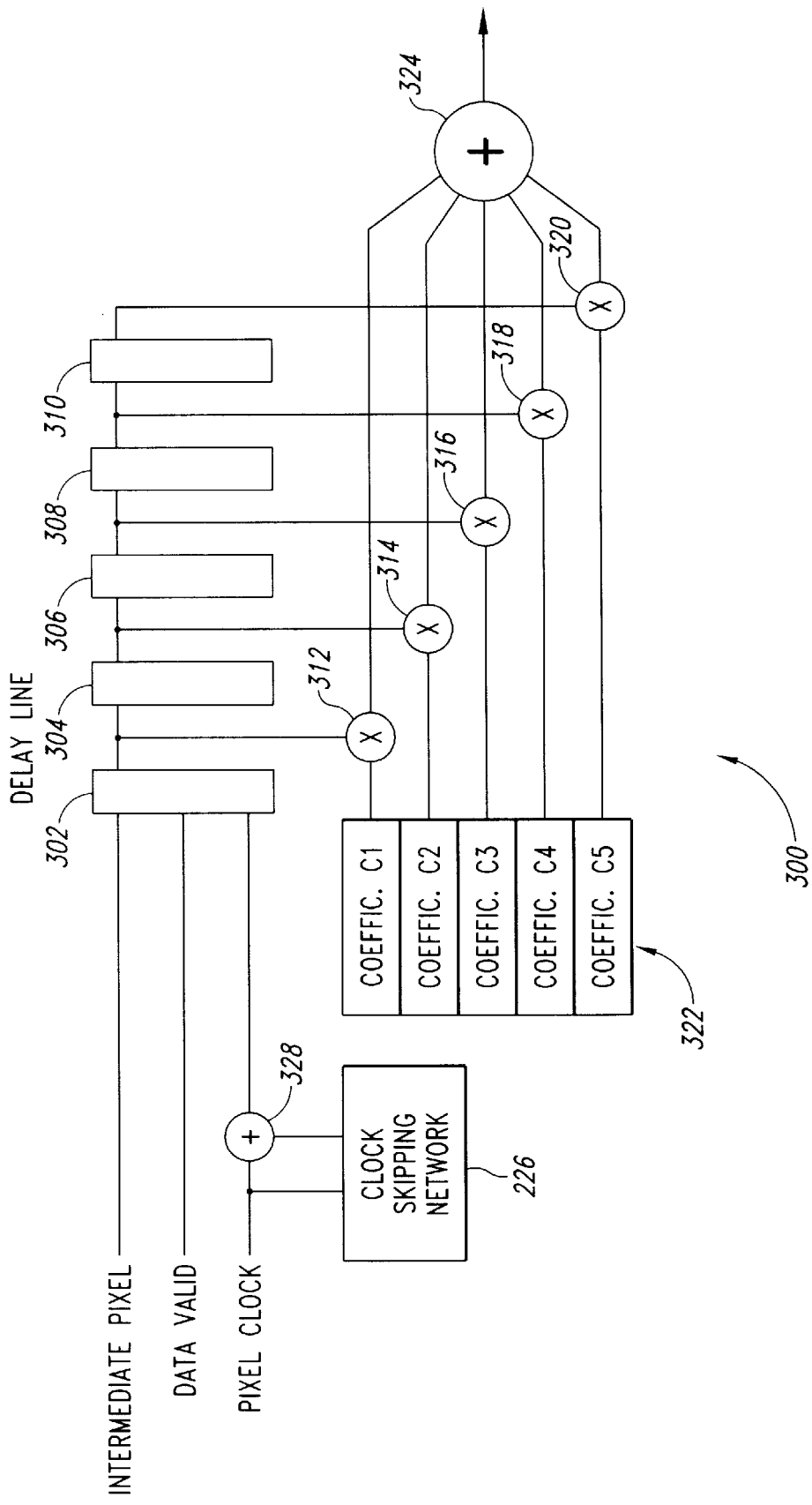
FIG. 9 is a block diagram of an alternative or additional embodiment of circuitry for the pyramid filter of the system of FIG. 3.

Referring to FIG. 9, an alternative embodiment of the present invention employs a pyramid filter circuit 300 that is similar to step 110 in the routine 100 of FIG. 4. Five delay elements 302–310 form a delay line that stores five sequential pixel values output from the circuit 200 of FIG. 8. Each of the pixel values stored in the delay elements 302–310 are multiplied by multiplier circuits 312–320 with coefficients c1–c5, all respectively. The coefficients c1–c5 are stored in a memory 322. The coefficients c1–c5 correspond to the coefficients of equation (5) above. Therefore, in the above example, the coefficients stored in the memory 322 correspond to the values −0.125, 0.25, 0.75, 0.25 and −0.125 for coefficients c1–c5, respectively.

An adder circuit 324 adds the resulting products from the multiplier circuits 312–320 to produce a final pixel value. A clock skipping network 226 is coupled to an adder or gate circuit 328 and skips two pixel values after every computation performed by the multiplier circuits 312–320 and adder circuit 324. As a result, the circuit 300 performs a pyramid filtering by gating in five sequential pixel values, multiplying them by corresponding coefficients c1–c5, and summing the resulting products. Thereafter, two pixel clock values are skipped, and a next five pixel values are stored in the delay line. The circuit 300 thereby filters a moving window of each of five sequential intermediate pixels output from the circuit 200 of FIG. 8. Overall, the cubic convolver circuit 200 and pyramid filter circuit 300 together reduce or enlarge a number of pixels in an originally stored image, depending upon the coefficients established. To resize a two-dimensional image, two of the cubic convolver circuits 200 and two of the pyramid filter circuits 300 are necessary, one for each axis of the two-dimensional image.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other machine vision systems, not necessarily the exemplary data collection symbology reader generally described above. Additionally, while the present invention has generally been described above as reducing the size of a digital image, the present invention can be employed to increase the size of an image. Furthermore, while the present invention has generally been described above as altering the size of a one- or two-dimensional image, a three-dimensional image (typically composed of a series of two-dimension images) or four-dimensional data can be altered under embodiments of the present invention.

These and other changes can be made to the invention in light of the above detailed description. In general, in the following claims, the terms used should not be construed to limit the invention to the specific embodiments disclosed in the specification and the claims, but should be construed to include all machine vision systems that operate in accordance with the claims to provide a method for resizing stored or digital images. Accordingly, the invention is not limited by the disclosure, but instead its scope is to be determined entirely by the following claims.

What is claimed is:

1. An apparatus for resizing a stored image, the stored image being comprised of a plurality of pixels, the apparatus comprising:
    a convolution interpolator coupled to receive the stored image and produce a set of intermediate pixel values based on M number of pixels in the stored image; and
    a pyramid filter, coupled to the cubic convolution interpolator, for altering the intermediate pixel values to D number of pixels, wherein D is an integer not equal to M,
    wherein the convolution interpolator includes:
        a plurality of delay elements for sequentially storing four pixels in the M number of pixels in the stored image;
        a plurality of multiplier circuits, each multiplier circuit being coupled to one delay element;
        a plurality of memory locations for storing a plurality of coefficients;
        a multiplexing circuit coupled between the plurality of multiplier circuits and to the plurality of memory locations, wherein the multiplexing circuit sequentially couples each of the plurality of memory locations to one of the plurality of multiplier circuits, and wherein each of the plurality of multiplier circuits outputs a product signal; and
        an adder circuit coupled to the plurality of multiplier circuits and adding the product signals therefrom.

2. An apparatus for resizing a stored image, the stored image being comprised of a plurality of pixels, the apparatus comprising:
    a convolution interpolator coupled to receive the stored image and produce a set of intermediate pixel values based on M number of pixels in the stored image; and
    a pyramid filter, coupled to the cubic convolution interpolator, for altering the intermediate pixel values to D number of pixels, wherein D is an integer not equal to M,
    wherein the pyramid filter includes:
        a plurality of delay elements for storing a set of pixels selected from the intermediate pixel values, each set being separated by $2^N$ pixels of the intermediate pixel values, wherein N is an integer;
        a plurality of multiplier circuits, each multiplier circuit being coupled to one delay element;
        a plurality of memory locations for storing a plurality of coefficients, wherein each memory location is coupled to one of the multiplier circuits and wherein each of the multiplier circuits outputs a product signal; and
        an adder circuit coupled to the multiplier circuits and adding the product signals output therefrom.

3. An apparatus for resizing a stored image, the stored image being comprised of a plurality of pixels, the apparatus comprising:
    a convolution interpolator coupled to receive the stored image and produce a set of intermediate pixel values based on M number of pixels in the stored image; and
    a pyramid filter, coupled to the cubic convolution interpolator, for altering the intermediate pixel values to D number of pixels, wherein D is an integer not equal to M,
    wherein the convolution interpolator circuitry is configured to interpolate the intermediate pixel values based on an equation $$C(x_j) = \sum_{p=-1}^{2} w_p * k(j-p),$$

wherein $w_p$ is a pixel in the stored image and k(j−p) is defined by:
        $k(z)=1-(u+3)|z*z|+(u+2)|z*z*z|$, if $0<|z|<1$;
        $k(z)=-4+8u|z|-5u|z*z|+u|z*z*z|$, if $1<|z|<2$;
        $k(z)=0$, otherwise, and wherein u is a real number.

4. An apparatus for resizing a stored image, the stored image being comprised of a plurality of pixels, the apparatus comprising:
    a convolution interpolator coupled to receive the stored image and produce a set of intermediate pixel values based on M number of pixels in the stored image; and
    a pyramid filter, coupled to the cubic convolution interpolator, for altering the intermediate pixel values to D number of pixels, wherein D is an integer not equal to M, wherein the pyramid filter is configured to filter the intermediate pixel values based on an equation bj=c1*a $(2^N j)$+c2*a$(2^N j+1)$+... cv*a$(2^N j+(v-1))$ wherein a$(2^N j)$ ... a$(2^N j+(v-1))$ are intermediate pixel values, wherein j=0, ..., $2^{N}$*D, wherein N and v are integers, and wherein c1 through cv are preselected coefficients that satisfy predetermined rules.

5. An apparatus for resizing a stored image, the stored image being comprised of a plurality of pixels, the apparatus comprising:

a convolution interpolator coupled to receive the stored image and produce a set of intermediate pixel values based on M number of pixels in the stored image; and a pyramid filter, coupled to the cubic convolution interpolator, for altering the intermediate pixel values to D number of pixels, wherein D is an integer not equal to M, wherein the cubic convolution interpolator is configured to produce $2^N$*D intermediate pixel values based on the M number of pixels in the stored image, wherein N and D are whole numbers selected so that an absolute value of M-$2^N$*D is a minimum, and wherein the pyramid filter is configured to reduce the $2^N$*D intermediate pixel values to D number of pixels and analyze a window of L number of pixels in the $2^N$*D intermediate pixel values, and wherein the window jumps $2^N$ pixels along the $2^N$*D intermediate pixel values.

6. A method of reducing the size of a stored image comprising the steps of:

storing an image, the image being comprised of a plurality of pixels, including M number of pixels;

determining a final image size D wherein an absolute value of M-$2^N$*D is a minimum and N and D are whole numbers;

cubic convolution interpolating the M number of pixels in the stored image;

producing $2^N$*D intermediate pixel values based on the M number of pixels in the stored image; and reducing the $2^N$*D intermediate pixel values to D number of pixels based on pyramid filtering, wherein the pyramid filtering analyzes a window of L number of pixels in the $2^N$*D intermediate pixel values and jumps the window $2^N$ pixels along the $2^N$*D intermediate pixel values.

7. The method of claim 6 wherein the step of producing includes the steps of:

storing four sequential pixels in the M number of pixels in the stored image;

storing a plurality of coefficients;

sequentially multiplying each of the plurality of memory locations to one of the four stored pixels to produce four products; and adding the four products.

8. The method of claim 6 wherein the step of reducing includes the steps of:

storing five pixels of the $2^N$*D intermediate pixel values for every $2^N$ pixels of the intermediate pixel values;

storing five coefficients;

multiplying each coefficient with one of the stored pixel values to produce products; and adding the five products.

9. The method of claim 6 wherein the step of cubic convolution interpolating includes the step of interpolating the intermediate pixel values based on an equation $$C(x_j) = \sum_{p=-1}^{2} w_p * k(j-p),$$

wherein $w_p$ is a pixel in the stored image and k(j-p) is defined by:

k(z)=1−(u+3)|z*z|+(u+2)|z*z*z|, if 0<|z|<1;

k(z)=−4+8u|z|−5u|z*z|+u|z*z*z|, if 1<|z|<2;

k(z)=0, otherwise, and wherein u is a real number between 0.1 and 3.

10. The method of claim 6 wherein the step of reducing includes the step of filtering the intermediate pixel values based on an equation bj=c1*a(2j) +c2*a(2j+1)+c3*a(2j+2)+c4*a (2j+3)+c5*a(2j+4), wherein a(2j) through a(2+4) are intermediate pixel values, wherein j=1, ..., $2^N$*D, wherein c1 through c5 are predetermined coefficients, and wherein c1+c2+c3+c4+c5=1, c1=c5, c2=c4, and c3+c1+c5=c2+c4.

11. The method of claim 6 wherein L=5 and wherein the step of reducing includes the step of filtering the intermediate pixel values based on an equation bj=c1*a(2j)+c2*a (2j+1)+c3*a (2j+2)+c4*a(2j+3)+c5*a(2j+4), wherein a(2j), through a(2j+4) are intermediate pixel values, wherein j=1, ..., $2^N$*D, and wherein c1=c5=−0.125, c2=c4=0.25 and c3=0.75.

12. The method of claim 6 further comprising the step of repeating the steps of producing, and reducing for series of pixels in two dimensions of the stored image.

13. The method of claim 6 wherein the steps are performed in the order of: storing, determining, cubic convolution interpolating, producing and reducing.

14. A method resizing a stored image, the stored image being comprised of a plurality of pixels, the method comprising:

convolution interpolating the stored image to produce a set of intermediate pixel values based on M number of pixels in the stored image; and pyramid filtering the intermediate pixel values to produce D number of pixels, wherein D is an integer not equal to M, wherein convolution interpolating includes:

storing a plurality of sequential pixels in the M number of pixels in the stored image;

storing a plurality of coefficients;

sequentially multiplying each of the plurality of memory locations to one of the plurality of stored pixels to produce products; and adding the products.

15. A method resizing a stored image, the stored imaie being comprised of a plurality of pixels, the method comprising:

convolution interpolating the stored image to produce a set of intermediate pixel values based on M number of pixels in the stored image; and pyramid filtering the intermediate pixel values to produce D number of pixels, wherein D is an integer not equal to M, wherein pyramid filtering includes:

storing a set of pixels selected from the intermediate pixel values, each set being separated by $2^N$ pixels of the intermediate pixel values, wherein N is an integer;

storing a plurality of coefficients;

multiplying each coefficient with one of the stored pixel values to produce products; and
adding the products.

16. A method resizing a stored image, the stored image being comprised of a plurality of pixels, the method comprising:
convolution interpolating the stored image to produce a set of intermediate pixel values based on M number of pixels in the stored image; and
pyramid filtering the intermediate pixel values to produce D number of pixels, wherein D is an integer not equal to M,
wherein convolution interpolating includes cubic convolution interpolating the intermediate pixel values based on an equation $$C(x_j) = \sum_{p=-1}^{2} w_p * k(j-p),$$

wherein $w_p$ is a pixel in the stored image and k(j-p) is defined by:
k(z)=1−(u+3)|z*z|+(u+2)|z*z*z|, if 0<|z|<1;
k(z)=−4+8u|z|−5u|z*z|+u|z*z*z|, if 1<|z|<2;
k(z)=0, otherwise, and wherein u is a real number.

17. A method resizing a stored image, the stored image being comprised of a plurality of pixels, the method comprising:
convolution interpolating the stored image to produce a set of intermediate pixel values based on M number of pixels in the stored image; and
pyramid filtering the intermediate pixel values to produce D number of pixels, wherein D is an integer not equal to M, p1 wherein reducing includes filtering the intermediate pixel values based on an equation bj=c1*a(2j)+ c2*a(2j+1)+c3*a(2j+2)+c4*a(2j+3)+c5*a(2j+4), wherein a(2j) through a(2j+4) are intermediate pixel values, wherein j=1, . . . , $2^N*D$ , wherein c1 through c5 are predetermined coefficients, and wherein c1+c2+ c3+c4+c5=1, c1=c5, c2=c4, and c3+c1+c5=c2+c4.

18. A method resizing a stored image, the stored image being comprised of a plurality of pixels, the method comprising:
convolution interpolating the stored image to produce a set of intermediate pixel values based on M number of pixels in the stored image; and
pyramid filtering the intermediate pixel values to produce D number of pixels, wherein D is an integer not equal to M,
wherein pyramid filtering includes altering the intermediate pixel values based on an equation bj=c1*a($2^N$j)+ c2*a($2^N$j+1)+. . . cv*a ($2^N$j+(v−1)) wherein a($2^N$j) . . . a($2^N$j+(v−1)) are intermediate pixel values, wherein j=0, . . . , $2^N*D$, wherein N and v are integers, and wherein c1 through cv are preselected coefficients that satisfy predetermined rules.

19. A method resizing a stored image, the stored image being comprised of a plurality of pixels, the method comprising:
convolution interpolating the stored image to produce a set of intermediate pixel values based on M number of pixels in the stored image; and
pyramid filteringz the intermediate pixel values to produce D number of pixels, wherein D is an integer not equal to M,
wherein convolution interpolating includes producing $2^N*D$ intermediate pixel values based on M number of pixels, in the stored image, wherein N and D are whole numbers selected so that an absolute value of M-$2^N*D$ is a minimum, and
wherein pyramid filtering includes analyzing a window of L number of pixels in the $2^N*D$ intermediate pixel values, wherein the window jumps $2^N$ pixels along the $2^N*D$ intermediate pixel values, and reducing the $2^N*D$ intermediate pixel values to D number of pixels.

* * * * *

UNITED STATES PATENT AND TRADEMARK OFFICE
CERTIFICATE OF CORRECTION

PATENT NO : 6,018,597
DATED     : January 25, 2000
INVENTOR(S): Pavel A. Maltsev and Ken Coffman It is certified that error appears in the above-identified patent and that said Letters Patent is hereby corrected as shown below:

Column 14, line 52, "imaie" should be --image--;

Column 15, line 34, after "M," delete "pl";

Column 15, line 34, "wherein" begins a new paragraph; and

Column 16, line 25, "filteringz" should be --filtering--.

Signed and Sealed this

Thirteenth Day of February, 2001

*Attest:*

NICHOLAS P. GODICI

*Attesting Officer*   *Acting Director of the United States Patent and Trademark Office*